US012614276B2

(12) United States Patent　(10) Patent No.:　US 12,614,276 B2
Sudre et al.　(45) Date of Patent:　Apr. 28, 2026

(54) SYSTEM AND METHOD FOR ESTIMATING AN INDICATOR OF THE TISSUE ACTIVITY OF AN ORGAN

(71) Applicant: OLEA MEDICAL, La Ciotat (FR)

(72) Inventors: Romain Sudre, Montpellier (FR);
Julien Rouyer, Aix-en-Provence (FR);
Timothé Boutelier, Ceyreste (FR);
Christophe Avare, Ceyreste (FR)

(73) Assignee: OLEA MEDICAL, La Ciotat (FR)

( * ) Notice: Subject to any disclaimer, the term of this patent is extended or adjusted under 35 U.S.C. 154(b) by 580 days.

(21) Appl. No.: 17/926,302

(22) PCT Filed: May 18, 2021

(86) PCT No.: PCT/FR2021/050872
§ 371 (c)(1),
(2) Date: Nov. 18, 2022

(87) PCT Pub. No.: WO2021/234278
PCT Pub. Date: Nov. 25, 2021

(65) Prior Publication Data
US 2023/0214999 A1　Jul. 6, 2023

(30) Foreign Application Priority Data

May 20, 2020　(FR) .................................... F2005142

(51) Int. Cl.
*G06T 7/00*　(2017.01)
*G06T 7/62*　(2017.01)
(52) U.S. Cl.
CPC .............. *G06T 7/0012* (2013.01); *G06T 7/62* (2017.01); *G06T 2207/10092* (2013.01); *G06T 2207/30016* (2013.01)

(58) Field of Classification Search
CPC .. G01N 29/069; G01N 29/265; G01N 29/445; G01N 29/4481; G01N 2291/0289
See application file for complete search history.

(56) References Cited

U.S. PATENT DOCUMENTS

| 9,404,986 B2 * | 8/2016 | White | ..................... | G01R 33/48 |
| 2011/0044524 A1 * | 2/2011 | Wang | ................. | G01R 33/5601 |
| | | | | 382/131 |

(Continued)

FOREIGN PATENT DOCUMENTS

| EP | 3387457 A1 | 10/2018 | |
| WO | WO-2017097656 A1 * | 6/2017 | ............. A61B 5/055 |
| WO | 2019063342 A1 | 4/2019 | |

OTHER PUBLICATIONS

Patterson, Daniel M., Anwar R. Padhani, and David J. Collins. "Technology insight: water diffusion MRI—a potential new biomarker of response to cancer therapy." Nature clinical practice Oncology 5.4 (2008): 220-233. (Year: 2008).*

(Continued)

*Primary Examiner* — Oneal R Mistry
*Assistant Examiner* — Rachel L Roberts
(74) *Attorney, Agent, or Firm* — BUCHANAN INGERSOLL & ROONEY PC

(57)　ABSTRACT

The invention relates to a system and method for quantifying a novel biomarker of the tissue activity of a human or animal organ. By way of preferred application, such a biomarker describes the diffusivity of biological fluids in living tissues in the form of a novel indicator of the diffusion of water molecules in living tissues on the basis of diffusion data resulting from the acquisition of a sequence of images of one or more parts of the body of an animal or human patient. Particularly resistant and stable with respect to noise present in the medical imaging signals from which the experimental data stem, the novel biomarker is relevant in a large number (Continued)

of applications including, inexhaustively, the analysis and/or monitoring of cancers, or the assessment of strokes.

12 Claims, 5 Drawing Sheets

(56) References Cited

U.S. PATENT DOCUMENTS

| | | | | |
|---|---|---|---|---|
| 2014/0296842 | A1* | 10/2014 | Mansi | A61B 34/10 |
| | | | | 703/2 |
| 2016/0139226 | A1* | 5/2016 | Manikis | G01R 33/5608 |
| | | | | 703/2 |
| 2018/0095152 | A1* | 4/2018 | Triaire | G01R 33/5608 |
| 2019/0250235 | A1 | 8/2019 | Xu | |
| 2020/0069257 | A1* | 3/2020 | Fleming | G06T 11/005 |
| 2020/0214619 | A1* | 7/2020 | Leng | G06T 7/11 |
| 2020/0372669 | A1* | 11/2020 | Lachner | G06T 7/62 |
| 2023/0214999 | A1* | 7/2023 | Sudre | G06T 7/62 |
| | | | | 382/131 |
| 2023/0386032 | A1* | 11/2023 | Wei | G06V 10/82 |
| 2023/0401697 | A1* | 12/2023 | Bradley | G06V 10/7715 |

OTHER PUBLICATIONS

International Search Report (PCT/ISA/210) and Written Opinion (PCT/ISA/237) mailed on Sep. 15, 2021, by the European Patent Office as the International Searching Authority for International Application No. PCT/FR2021/050872. (16 pages).

\* cited by examiner

SYSTEM AND METHOD FOR ESTIMATING AN INDICATOR OF THE TISSUE ACTIVITY OF AN ORGAN

The invention relates to a system and a method for quantifying a novel biomarker of the tissue activity of a human or animal organ. By way of preferred application example, such a biomarker describes the diffusivity of biological fluids in living tissues in the form of a novel indicator of the diffusion of water molecules in living tissues on the basis of diffusion data resulting from the acquisition of a sequence of images of one or more parts of the body of an animal or human patient. Within the framework of this preferred application example, such a biomarker is referred to hereinafter as "tissue activity indicator" or "TAI" the acronym thereof.

The invention relies in particular on magnetic resonance imaging techniques or MRI, more particularly diffusion weighted imaging or DWI, computed tomography (CT). These techniques make it possible to rapidly obtain valuable items of information on the movements of the water molecules within organs or tissues present in human beings or animals. These items of information are particularly crucial for a practitioner seeking to establish a diagnosis and to make a treatment decision in the treatment of pathologies.

In order to implement such techniques, an imaging device 1 using nuclear magnetic resonance, as shown by way of non-limitative example in FIGS. 1 and 2, is generally used. The latter can deliver a plurality of sequences of digital images 12 of one or more parts of the body of a patient, by way of non-limitative examples, the brain, the heart, the lungs. To this end, said device applies a combination of high-frequency electromagnetic waves on the part of the body in question and measures the signal re-emitted by certain atoms, such as by way of non-limitative example, hydrogen for nuclear magnetic resonance imaging. The device thus makes it possible to determine the magnetic properties and consequently, the chemical composition of the biological tissues and therefore their nature, in each elementary volume, commonly called a voxel, of the imaged volume. The imaging device 1 using nuclear magnetic resonance imaging is controlled by means of a console 2. A user 6, for example an operator, practitioner or investigator, can thus choose commands 11 to control the device 1, on the basis of parameters or instructions 16 input via an input human-machine interface 8 of the analysis system. Such a human-machine interface 8 can consist for example of a computer keyboard, a pointing device, a touch screen, a microphone, or, more generally, any interface arranged to express a gesture command or an instruction issued by a human 6 as control or parameterizing data. On the basis of items of information 10 generated by said device 1, a plurality of digital image sequences 12 is obtained of a part of a body of a human being or an animal. Such items of information 10 or images 12 will also be referred to as "experimental data".

The image sequences 12 can optionally be stored within a server 3 and constitute a medical file 13 of a patient. Such a file 13 can comprise images of different types, such as functional images demonstrating the activity of the tissues, or anatomical images reflecting the properties of the tissues. The image sequences 12 or, more generally, the experimental data, are analyzed by a processing unit 4 arranged for this purpose, in the form for example of one or more microprocessors or microcontrollers implementing appropriate application program instructions loaded in storage means, such as a non-volatile memory, of said imaging analysis system.

Said processing unit 4 comprises means for communicating with the outside world for collecting the images. Said communication means also make it possible for the processing unit 4 to deliver finally, via an output human-machine interface 5 to a user 6 of the imaging analysis system, a rendering, for example graphical and/or audible, of an estimation or a quantification of a biomarker produced by said processing unit 4 on the basis of the experimental data 10 and/or 12 obtained by magnetic resonance imaging. Throughout the document, by "output human-machine interface" is meant any device, used alone or in combination, making it possible to output or to deliver a graphical, haptic, audible representation or, more generally, one that can be perceived by a human being, of a reconstructed physiological signal, in this case a biomarker, to a user 6 of a magnetic resonance imaging analysis system. Such an output human-machine interface 5 can consist non-limitatively of one or more screens, loudspeakers or other suitable alternative means. Said user 6 of the analysis system can thus confirm or invalidate a diagnosis, decide on a therapeutical action that they consider appropriate, undertake further investigations, etc. Optionally, this user 6 can parameterize the operation of the processing unit 4 or of the output human-machine interface 5, by means of operation and/or acquisition parameters 16. For example, they can thus define display thresholds or choose the biomarkers, indicators or estimated or quantified parameters for which an available representation is desirable. To this end, the user utilizes the input human-machine interface 8 mentioned above or a second input interface provided for this purpose. Advantageously, the input 8 and output 5 human-machine interfaces can constitute one and the same physical entity only. Said input 8 and output 5 human-machine interfaces of the imaging analysis system can also be integrated into the acquisition console 2. A variant exists, described with reference to FIG. 2, for which an imaging system, as described above, also comprises a pre-processing unit 7 for analyzing the image sequences 12, deducing experimental signals 15 therefrom, and delivering these latter to the processing unit 4 which is thus relieved of this task.

The acquisition of one or more items of experimental data, advantageously one or more experimental signals respectively, by magnetic resonance imaging, hereinafter referred to as MRI, can be carried out by regularly sampling a parallelepiped volume in a given sectional plane, among which the coronal, sagittal and axial planes can be mentioned. The two-dimensional images obtained are constituted by pixels given a thickness corresponding to the thickness of the section and called voxels. Such an imaging technique thus enables the acquisition of images that may equally well be anatomical, to make it possible for example to mirror the properties of the tissues, or functional, to demonstrate for example the activity of the tissues.

Among the techniques or methods based on magnetic resonance imaging, diffusion magnetic resonance imaging can be distinguished. Diffusion imaging provides items of information that are not available on conventional imaging sequences. By way of non-limitative example, it allows early diagnosis of ischemic vascular accident and constitutes an aid to the diagnosis of cancerous lesions. It also provides items of prognosis information, by making it possible for example to distinguish a generally reversible vasogenic oedema from a generally irreversible cytotoxic oedema. As the diffusion observed is constrained by the surrounding tissues, this imaging method makes it possible in particular to estimate indirectly the position, orientation and anisotropy of the fibrous tissues or structures, such as by way of non-limitative example the white matter bundles in the brain. As magnetic resonance imaging is mainly based on analysis of the response of the hydrogen atoms of the water molecules, it is mainly the diffusion of the water molecules that is observed by this method in the form of a determined biomarker, also called "parameter of interest".

Among the sequences commonly used in diffusion imagery, it is possible to distinguish the multi-b diffusion imaging sequence which seeks to give one or more items of information on the movements of the water molecules present in the organism of a living being, generally an animal or human being. In an open liquid medium for example, the water molecules are generally moved by a Brownian motion: this is then referred to as free diffusion. Conversely, in living tissues, fluid movements are constrained by several physical factors, such as, for example, variations in hydrostatic pressure and osmotic pressure, and also by structural factors, such as, for example, the cell density of the tissues and the presence of macromolecules within said tissues.

Evaluation of the diffusion in a given voxel relies on an iterative acquisition for different values of an acquisition parameter, in this case the intensity of a magnetic field gradient, hereinafter referred to as the "diffusion gradient", commonly called "parameter b" defined such that $$b = \gamma^2 g_D^2 \delta^2 \left( \Delta - \frac{\delta}{3} \right)$$

where $\gamma$ consists of the gyromagnetic ratio and the following parameters define the characteristics of the impulse gradient: the amplitude $g_D$, the duration of the pulse $\delta$ and the time $\Delta$ between two pulses, also referred to as "repetition time".

Generally, two successive diffusion gradients are used to perform a measurement at a given b value. Initially, in phase coherence, the nuclear spins of the hydrogen protons of the water molecules are de-phased by a first diffusion-pulsed magnetic field gradient, while a second diffusion-pulsed magnetic field gradient makes it possible to return said phase-coherent nuclear spins to the initial state thereof. Such a reversibility of the initial state is only possible on condition that the diffusion phenomenon is zero. In the case where a diffusion phenomenon exists, the stochastic movement of the water molecules leads to inability of the second gradient to cause a return of the spins to the initial state thereof.

Thus, the random distribution of the phases leads to a drop in the intensity of the acquired signal, since the latter results from the sum of the contributions of each of the spins present in the voxel in question. Such a loss of the intensity of a signal is treated as an attenuation. When the b value increases, the repetition time $\Delta$ increases by definition: a greater de-phasing is then observed, expressed by a greater attenuation of signal intensity. The attenuation of signal intensity, commonly called signal attenuation, as observed, can be modelled as the ratio of the measured signal S(D,b) to the signal obtained without diffusion gradient $S_0$, i.e. when b is zero. This ratio has an exponential behaviour that is a function of a specific biomarker, the diffusion coefficient D, and of the parameter b, such that $$\frac{S(D, b)}{S_0} = e^{-bD}.$$

Such a model relies on the hypothesis of Gaussian diffusion of the water molecules present in the biological tissues:

the dimension of the parameter b thus corresponds to the inverse dimension of the diffusion coefficient D and is expressed as $s/mm^2$. FIG. 3 shows an example of a signal intensity attenuation curve, more particularly the exponential dependency of the signal attenuation as a function of the parameter b for a diffusion coefficient D of $1.3 \times 10^{-3}$ $mm^2/s$.

To make it possible to utilize the signal attenuation curve and finally, estimate one or more biomarkers, such biomarkers providing an item of information on the metabolism of the tissues, several investigators have proposed different analytical models of diffusion. By way of non-limitative examples, such a biomarker can consist of a diffusion coefficient.

One of the models most employed in the clinical field currently consists of the mono-exponential model. Such a mono-exponential model relies on the utilization of modelling the ratio of the measured signal S(D,b) to the signal obtained without diffusion gradient $S_0$, where the diffusion coefficient is interpreted as an apparent diffusion coefficient ADC, defined such that $$\ln\left[\frac{S(D, b)}{S_0}\right] = -bADC.$$

In a variant, other practitioners employ the IVIM (acronym for "intravoxel incoherent motion") concept and model also called bi-exponential model, initially introduced and developed by Mr Denis Le Bihan. Such a model makes it possible in particular to evaluate quantitively all the microscopic translation movements that could contribute to the signal acquired by the diffusion MRI. In this model, the biological tissue contains two distinct environments: the molecular diffusion of water in the tissue, also called "true diffusion" and the microcirculation of the blood in the capillary network, also called "perfusion". The IVIM concept consists of considering that the water flowing in the capillaries, for a given voxel, mimics a random walk, also called "pseudodiffusion", as long as the hypothesis according to which all directions are represented in the capillaries, i.e. there is no net coherent flow in any direction, is satisfied. The blood flow in the capillaries, which is called "perfusion phenomenon", mimics a diffusion process and has an impact on the measurements acquired by diffusion MRI: it is thus responsible for a signal attenuation in diffusion MRI, which depends on the velocity of the blood flow and the vascular architecture. The effect of the pseudodiffusion on the signal attenuation depends on the value b. However, the attenuation rate of the signal resulting from the pseudodiffusion is generally of an order of magnitude greater than the molecular diffusion in the tissues, so that the relative contribution thereof to the diffusion weighted MRI signal becomes significant only at very low b values, which makes it possible to separate the effects of diffusion and perfusion. In fact, for low values of b between 0 and 200 $s/mm^2$, the multi-b diffusion imaging techniques are not only sensitive to the diffusion phenomena but also become sensitive to the capillary perfusion phenomena. In this case, the signal attenuation can then be modelled by a bi-exponential function, such that $$\frac{S(D, D^*, f, K, b)}{S_0} = f\exp(-bD^*) + (1 - f)\exp(-bD)$$

where f consists of the perfusion fraction, D consists of the diffusion coefficient and D* consists of the pseudodiffusion coefficient.

As a variant or in addition, a third model has been employed to take account of the non-Gaussian behaviour of the diffusion within a tissue: such a model is called the kurtosis model. In fact, for very high b values exceeding 1000 s/mm², the Gaussian diffusion regime is interrupted. While the Gaussian diffusion hypothesis is correct in the liquids and/or gels the movements of which are free, such a hypothesis becomes invalid when the fluid is constrained by barriers limiting the free displacement of the molecules. This constrained diffusion, also called restricted diffusion, is observed in particular in the biological tissues, since the membrane of the cells compartmentalizes the interstitial fluid. Thus, at high b values, i.e. after a certain time allowed for the diffusion phenomenon to occur, the signal attenuation deviates from the Gaussian model. Investigators have therefore proposed a generalization of the IVIM model so as to take account of the deviation effect, such that $$\frac{S(D, D^*, f, K, b)}{S_0} = f\exp(-bD^*) + (1 - f)\exp\left(-bD + b^2 D^2 \frac{K}{6}\right)$$

where K consists of the dimensionless kurtosis coefficient characterizing the degree of deviation with respect to the Gaussian model.

FIG. 4 shows an example of logarithmic representation of the signal attenuation, i.e. the ratio of the measured signal S(D,b) to the signal obtained without diffusion gradient $S_0$, over a wide range of b values, ranging from 0 to 3000 s/mm². Such a representation is divided mainly into three phases, referenced (1), (2) and (3) in FIG. 4, and makes it possible in particular to display the two deviations, corresponding to the ranges of b values associated with phases (2) and (3) in FIG. 4, in the Gaussian model or mono-exponential model, corresponding to the range of b values associated with phase (1) in FIG. 4. Such deviations are in particular observed respectively, in the low b values (corresponding to phase (2) in FIG. 4) of the order of 0 to 200 s/mm², the deviation then being caused by the perfusion effect, and in the high b values (corresponding to phase (3) in FIG. 4) of the order of 1000 to 3000 s/mm², the deviation then being caused by the restricted diffusion effect.

Using the analytical models described above so as to utilize the attenuation curves makes it possible in particular to generate a beneficial description of the diffusion phenomenon in the tissues at different biological scales. However, the implementation of such analytical models is generally not easy and the accuracy of the estimations is strongly associated with the quality of the data or the signals acquired. Generally, three main factors hinder the use thereof:

a long calculation time that can prove prohibitive in clinical use;
  a high level of noise in the data or signals acquired and originating from the multi-b diffusion acquisition sequences;
  the low number of b values provided by the current multi-b diffusion acquisition sequences.

Currently in widespread use in the clinical field, estimation of a biomarker, in the form of an apparent diffusion coefficient ADC by a mono-exponential model, relies mainly on experimental signals and/or data originating from the acquisition of two main b values: b=0 s/mm², i.e. without diffusion gradient, and b=1000 s/mm², diffusion-weighted. It requires low sampling and consequently relatively short acquisition times. However, such an estimation of the apparent diffusion coefficient ADC proves to be significantly degraded when the noise level becomes high. In addition, such a biomarker is generally not very sensitive to the different phenomena that can affect the diffusion signal, such as for example the IVIM or kurtosis effects mentioned above, and is consequently poorly representative of said phenomena.

Obtaining parametric images or maps representative of an estimated biomarker associated with an IVIM model or a kurtosis model makes it possible in particular to show the different diffusion regimes and thus, to inform a practitioner, or more broadly an operator, of the different microscopic processes that may then be occurring within an animal or human tissue, so as to make it possible, finally, to establish a diagnosis and make a therapeutic decision in the treatment of pathologies. However, the calculation times relating to estimations of one or more biomarkers associated with an IVIM model or a kurtosis model prove to be relatively long and the parametric maps obtained representative of such biomarkers are generally very sensitive to noise, in particular the maps representative of the perfusion fraction f, the pseudodiffusion coefficient D* and the dimensionless kurtosis coefficient K, as examined below with reference to FIGS. 7C, 7D and 8B. Furthermore, the low sampling of the signal attenuation curves does not offer favourable conditions for the use of IVIM models or the kurtosis model: in fact, the regressions employed in association with low sampling can lead to biased estimations, reducing the reliability and robustness thereof.

Currently, no method exists for estimating a biomarker on the basis of an item of experimental data, in particular of diffusion, making it possible to take account rapidly, robustly and reliably of microscopic phenomena, more particularly of the movements of the water molecules, demonstrated within an animal or human organ or tissue by imaging sequences, in particular of diffusion. The invention makes it possible to overcome all or part of the drawbacks raised by the known or aforementioned solutions.

Among the numerous advantages contributed by the invention, there may be mentioned that the latter makes it possible to:

quantify a novel biomarker of tissue activity that is particularly resistant and stable with respect to the noises present in the medical imaging signals from which the experimental data are derived;
  procure a novel biomarker that can be utilized and is pertinent to a large number of applications among which there may be mentioned, non-limitatively, the analysis and/or monitoring of cancers, the evaluation of cerebral vascular accidents;
  quantify a biomarker on the basis of raw experimental data, due to the very low sensitivity of the quantification method to noise, to the acquisition parameterization and to disparity of the imaging systems;
  quantify a biomarker that does not require significant calculation resources or a prohibitive calculation time, unlike the known biomarkers, due to the utilization of theoretical models to estimate these latter;
  adapt or parameterize the quantification of a novel biomarker according to the expectations of the practitioners, the means of acquisition, the organs examined.

According to a first subject, the invention provides for a method for quantifying a biomarker of an elementary volume, called "voxel", of an organ, said method being implemented by a processing unit of a diffusion MRI imaging analysis system, and comprising a step for generating the value of said biomarker, hereinafter denoted "tissue activity indicator" or TAI, on the basis of experimental data S(b).

In order to overcome the aforementioned drawbacks associated with the known techniques, the step for generating the value of the biomarker TAI consists, over a delimited interval $b_{min}$ to $b_{max}$, of values of an acquisition parameter b corresponding to the intensity of the diffusion gradient, in that the calculation $TAI=\int_{b_{min}}^{b_{max}} L(b)-\Gamma_S[S(b)]$ db, L(b) being a function of said acquisition parameter b and $\Gamma_S[S(b)]$, a bijective transformation of said experimental data S(b).

According to an advantageous embodiment, said function and bijective transformation can be mutually determined such that L(b) is greater than or equal to $\Gamma_S[S(b)]$, over all the values of the acquisition parameter b comprised between $b_{min}$ and $b_{max}$.

In a variant or in addition, said function and bijective transformation can be mutually determined, such that $L(b_{min})=\Gamma_S[S(b_{min})]$ and/or $L(b_{max})=\Gamma_S[S(b_{max})]$.

In order to facilitate the utilization of the biomarker TAI by any user of an imaging analysis system thus adapted, when the latter comprises an output human-machine interface, a method according to the invention can comprise a subsequent step for triggering an output of said quantified biomarker in a suitable format.

In order to adapt or parameterize the quantification of the biomarker according to the expectations of the practitioners or operators, the acquisition methods, the organs examined, when the imaging analysis system comprises an input human-machine interface, a method according to the invention can comprise a step for determining the function L(b) of said acquisition parameter b and of the bijective transformation $\Gamma_S[S(b)]$ of said experimental data S(b) on the basis of input data of a user of said input human-machine interface.

In order to quantify such a biomarker for a plurality of voxels in question, the step for generating the value of said biomarker can be implemented by successive iterations for a plurality of voxels in question, said tissue activity indicator being quantified per voxel.

By way of preferred example of output of the biomarker, the step for triggering an output of the latter can consist of generating an image in the form of a parametric map the pixels of which respectively encode the values of said quantified biomarker for the voxels in question.

According to a second subject, the invention provides for an imaging analysis system comprising a processing unit, means for communicating with the outside world and storage means, of which:

the communication means are arranged to receive from the outside world experimental data S(b) of an elementary volume of an organ;

the storage means comprise instructions the interpretation or execution of which by said processing unit causes the implementation of a method for quantifying a biomarker of an elementary volume of said organ according to the invention and described above.

By way of preferred application example:

the experimental data S(b) of an elementary volume of an organ can be data resulting from an acquisition of a signal by diffusion imaging;

the quantified biomarker can be an indicator of the diffusion of water molecules in an elementary volume of said organ.

According to a third subject, the invention provides for a computer program product comprising one or more instructions that can be interpreted or executed by the processing unit of an imaging analysis system according to the invention, said program being capable of being loaded in storage means of said system, characterized in that the interpretation or execution of said instructions by said processing unit causes the implementation of a method for quantifying a biomarker of an elementary volume according to the invention.

Other characteristics and advantages will become more clearly apparent on reading the following description and on examination of the accompanying figures among which:

FIG. 1, already described, shows a simplified description of a system for the analysis of images obtained by nuclear magnetic resonance;

FIG. 2, already described, shows a simplified description of a variant of a system for the analysis of images obtained by nuclear magnetic resonance;

FIG. 3, already described, shows an example of an intensity attenuation curve of an item of experimental data as a function of an acquisition parameter;

FIG. 4, already described, shows an example of logarithmic representation of intensity attenuation of an item of experimental data as a function of an acquisition parameter;

Figures 7A, 7B, 7C, 7D, 8A, 8B:
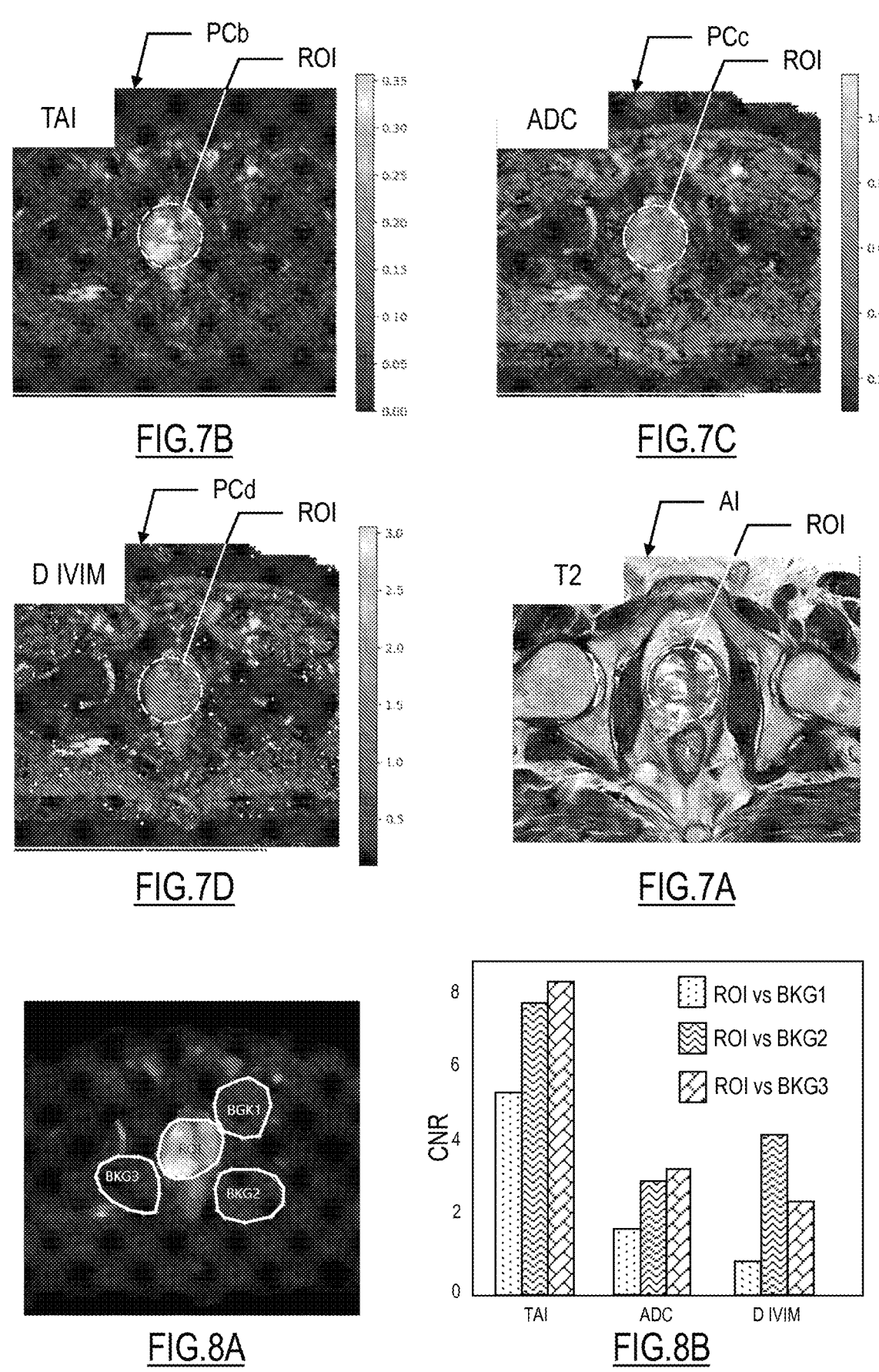
FIG. 7A shows an anatomic image comprising a region of interest, in this case a prostate, obtained by a T2 sequence.
FIG. 7B shows, in the form of an image, the graphical rendering of a quantified biomarker for each voxel of the aforementioned prostate with reference to FIG. 7A, on the basis of experimental diffusion data, following a method according to the invention.
FIG. 7C shows, in the form of an image, the graphical rendering of an estimated biomarker for each voxel of the aforementioned prostate with reference to FIG. 7A, on the basis of experimental diffusion data and a mono-exponential model following a method according to the prior art.
FIG. 7D shows, in the form of an image, the graphical rendering of an estimated biomarker for each voxel of the aforementioned prostate with reference to FIG. 7A, on the basis of experimental diffusion data and a bi-exponential model of the IVIM (intravoxel incoherent motion) type following a method according to the prior art.
FIG. 8A shows in the form of an image, the determination of four regions on the basis of a graphical representation such as that described with reference to FIG. 7B, obtained by the quantification of a biomarker according to the invention, said four regions describing a region of interest focused on the prostate and three other regions adjacent to the aforementioned.

FIG. 8B shows, in the form of histograms, the "contrast-to-noise" ratios during the distinguishing of said region of interest with respect to each of the three other aforementioned regions, when the source image is that obtained by the quantification of a biomarker (cf. FIG. 7B) according to the invention or according to the prior art, on the basis of a mono-exponential (cf. FIG. 7C) or bi-exponential (cf. FIG. 7D) model.

Figure 5:
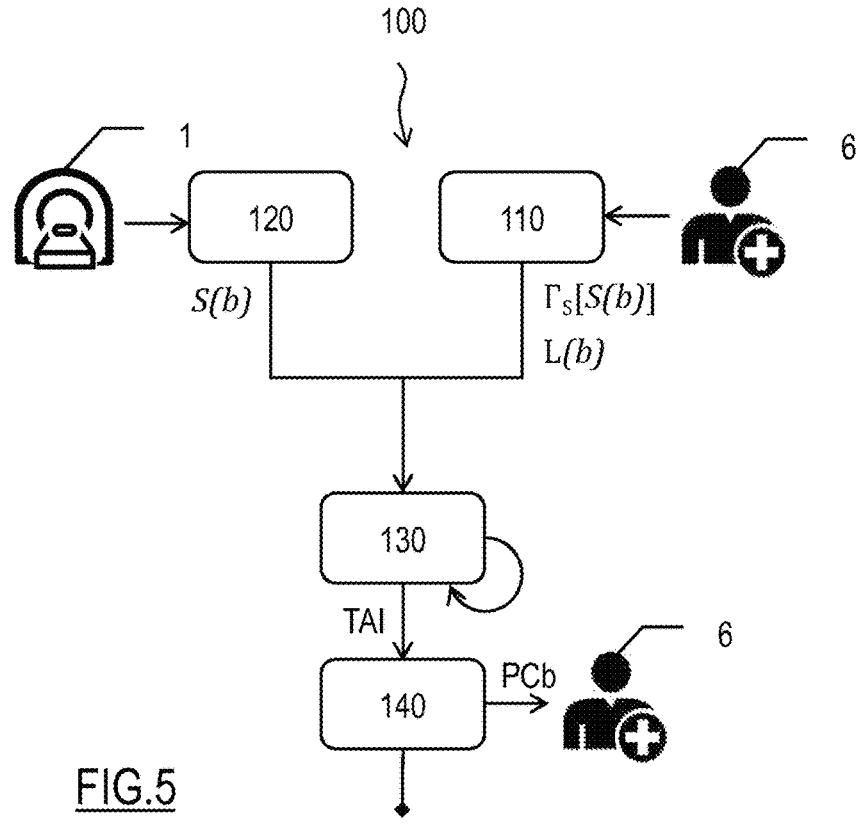
FIG. 5 shows a simplified description of a method according to the invention for quantifying a biomarker of an organ.

There will now be described, with reference to FIGS. 5 and 6A, a preferred but non-limitative embodiment example of a method according to the invention for quantifying a novel biomarker TAI, said biomarker being similar to a tissue activity indicator, obtained on the basis of experimental diffusion data of an organ, for example a prostate, in a human being. The invention is not to be considered limited to these examples of acquisition methods, organs, alone and could be applied to an animal.

Such a method 100 is intended to be implemented by a processing unit of a medical imaging analysis system such as that shown above with reference to FIG. 1 or FIG. 2.

It mainly comprises a step 130 for generating a biomarker TAI on the basis of experimental data S(b) for each voxel of interest of an organ. Such experimental data can be generated in a prior step 120 on the basis of an acquisition of signals by diffusion MRI imaging, according to an acquisition parameter b, in this case the intensity of the diffusion gradient, commonly called "parameter b". Such a step 130 can be implemented iteratively in order to quantify such a biomarker TAI for a set of voxels of interest.

A method 100 according to the invention also comprises, like estimation methods for other biomarkers originating from the prior art, a step 140 for encoding the value or the values of the quantified biomarker TAI for one or a plurality of voxels in the form of a graphical content, for example in the form of a parametric map. Such a parametric map can be presented in the form of a table of pixels, or commonly called "image" like the example of the parametric map PCb shown in FIG. 7B. Each pixel of said parametric map PCb advantageously encodes a triplet of integer values comprised between zero and two hundred and fifty-five according to the RGB (abbreviation for "red green blue") colour coding. Such a computerized colour coding is the most used by the available material. In general, computer screens reconstitute a colour by additive synthesis on the basis of three primary colours, a red, a green and a blue, forming on the screen a mosaic that is generally too small to be distinguished by a human eye. The RGB coding gives a value for each of these primary colours. Such a value is generally coded on one byte and thus belongs to an integer value interval comprised between zero and two hundred and fifty-five. The step 140 can thus consist of advantageously encoding the value of the biomarker TAI quantified for a voxel of interest on the basis of a colour gradient, for example from blue to yellow for encoding said biomarker from the lowest value to the highest. In this way, when a plurality of voxels of an organ are the subject of interest, each pixel of the parametric map PCb is associated with the corresponding voxel so as to show graphically, in two dimensions, the respective values of the quantified biomarker, for said plurality of voxels. The pixels encoding yellow describe the voxels for which the biomarker TAI demonstrates a high tissue activity, unlike those encoding green, demonstrating a medium tissue activity, or also those encoding blue, demonstrating a very low tissue activity. Any other graphical encoding could be implemented in step 140, in addition or in a variant, of the aforementioned gradient.

Figures 1, 2:
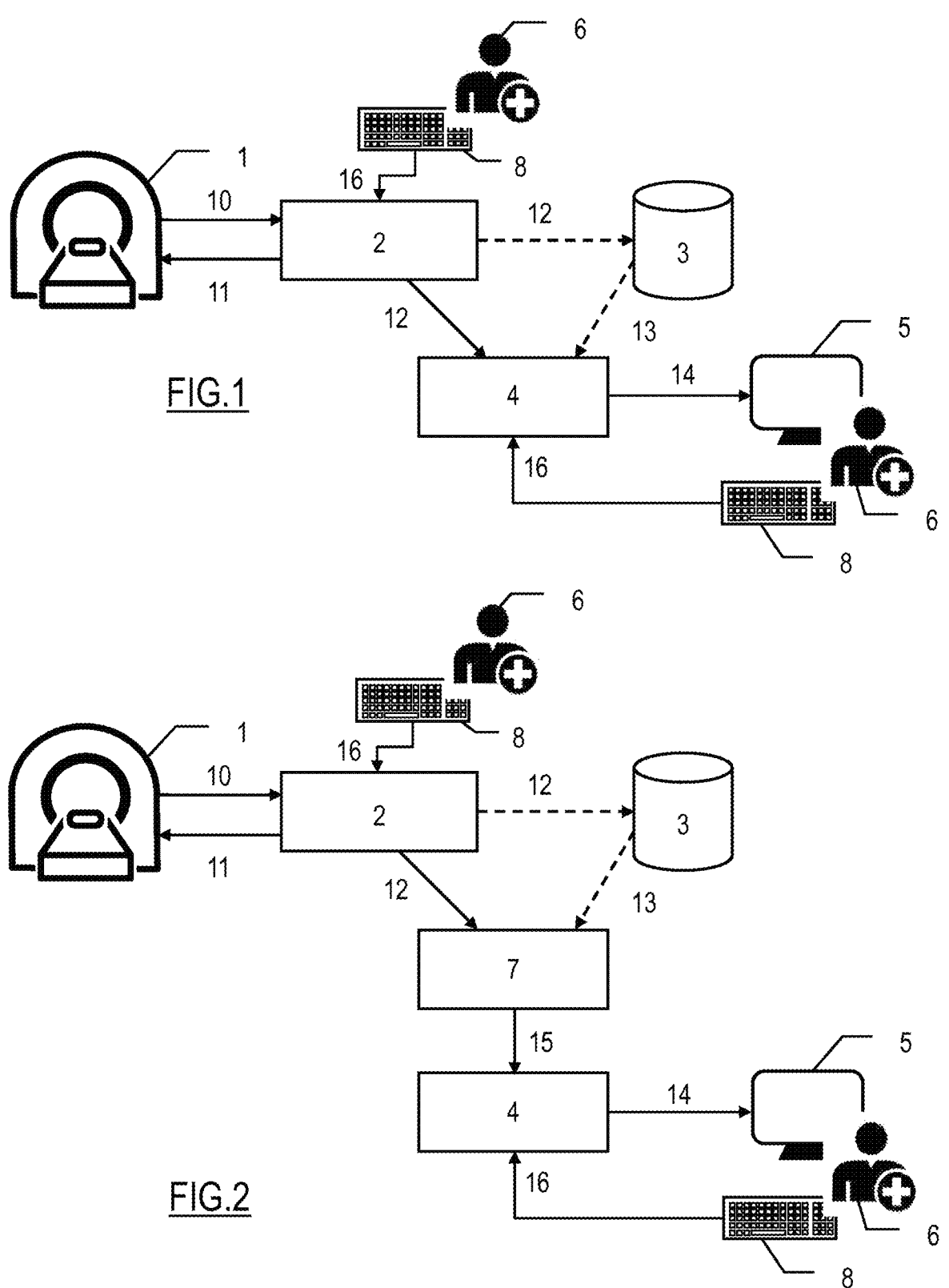
Figure 3:
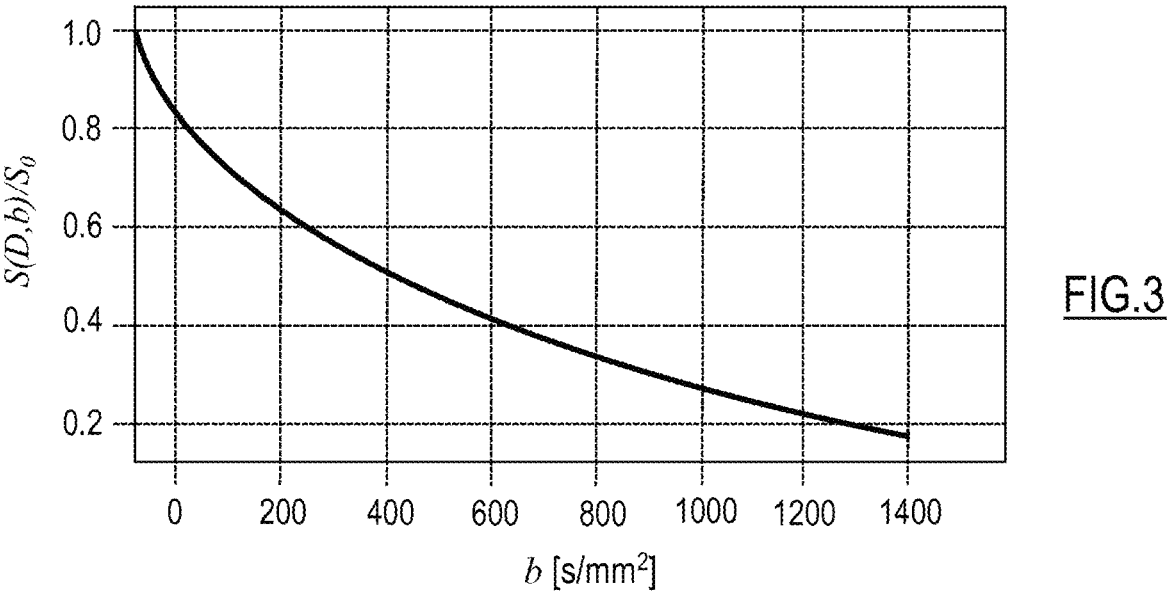
Figure 4:
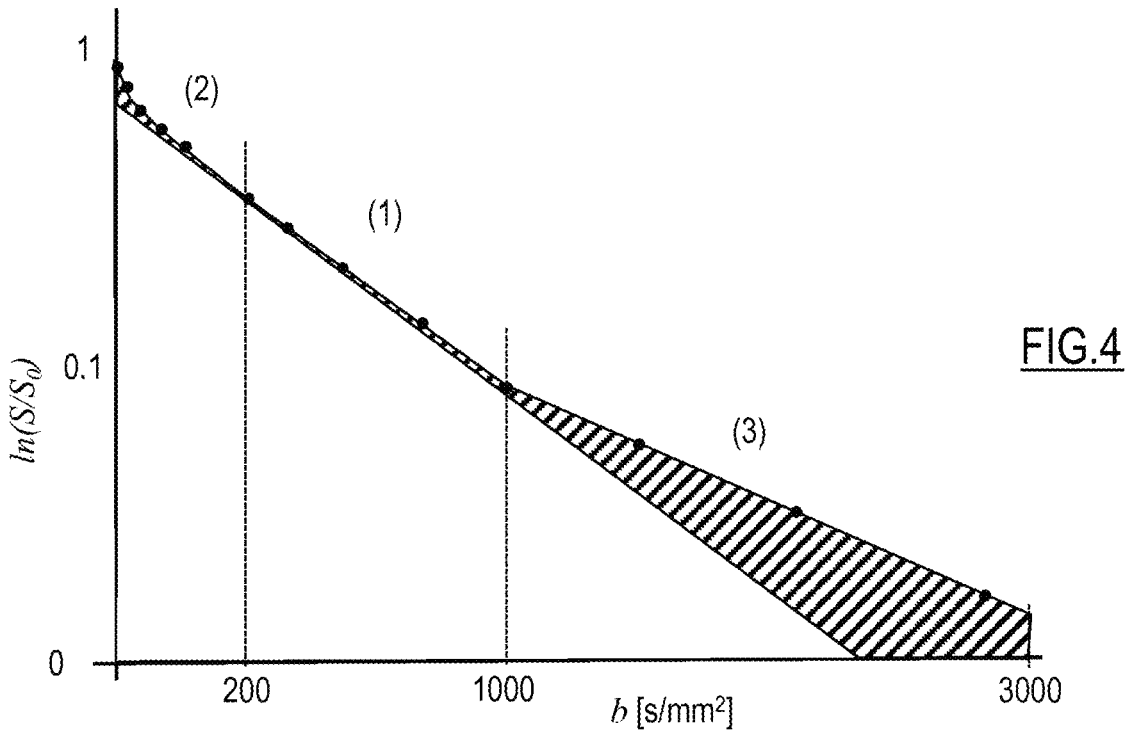

When the imaging analysis system implementing the method 100 comprises an output human-machine interface, such as a computer screen 5 as shown by the example in FIG. 1 or 2, the step 140 also consists of triggering an output in the advantageous form of a display or any outputting mode intelligible by a human being, of said indicator of quantified tissue activity TAI in a parametric map PCb, as mentioned above or in any other suitable format. In this way, a user 6 of said analysis system can consult the results of said quantification of the biomarker and benefit from a decision-making aid for a treatment act, for establishing a diagnosis or also for confirming or invalidating a clinical test.

To describe an example implementation of the step 130 of quantification of a biomarker TAI according to the invention, the experimental data S(b) should be considered, resulting from a step 120 of said method 100, for generating said experimental data on the basis of an acquisition of a signal by diffusion imaging in which the acquisition parameter b is the intensity of the diffusion gradient.

The step 130 therefore consists of the calculation $$TAI = \int_{b_{min}}^{b_{max}} L(b) - \Gamma_S[S(b)]db$$

where L(b) is a function of said acquisition parameter b and $\Gamma_S[S(b)]$ bijective transformation of said experimental data S(b). According to this example, said function and bijective transformation can be mutually determined, so that L(b) is greater than or equal to $\Gamma_S[S(b)]$ over all the values of the acquisition parameter b comprised between $b_{min}$ and $b_{max}$. In this way, the value of the biomarker TAI remains positive between $b_{min}$ and $b_{max}$. The invention is not to be considered limited by this advantageous choice.

According to a first embodiment, the bijective transformation $\Gamma_S[S(b)]$ is the identity function. It is therefore possible to write: $\Gamma_S[S(b)]=S(b)$.

The function L(b) can then be chosen as the straight line that links $S(b_{min})$ and $S(b_{max})$, determined according to the following relationship:

$$L(b) = \frac{S(b_{max}) - S(b_{min})}{b_{max} - b_{min}} \cdot b + \frac{b_{max} \cdot S(b_{min}) - b_{min} \cdot S(b_{max})}{b_{max} - b_{min}}$$

Figure 6A:
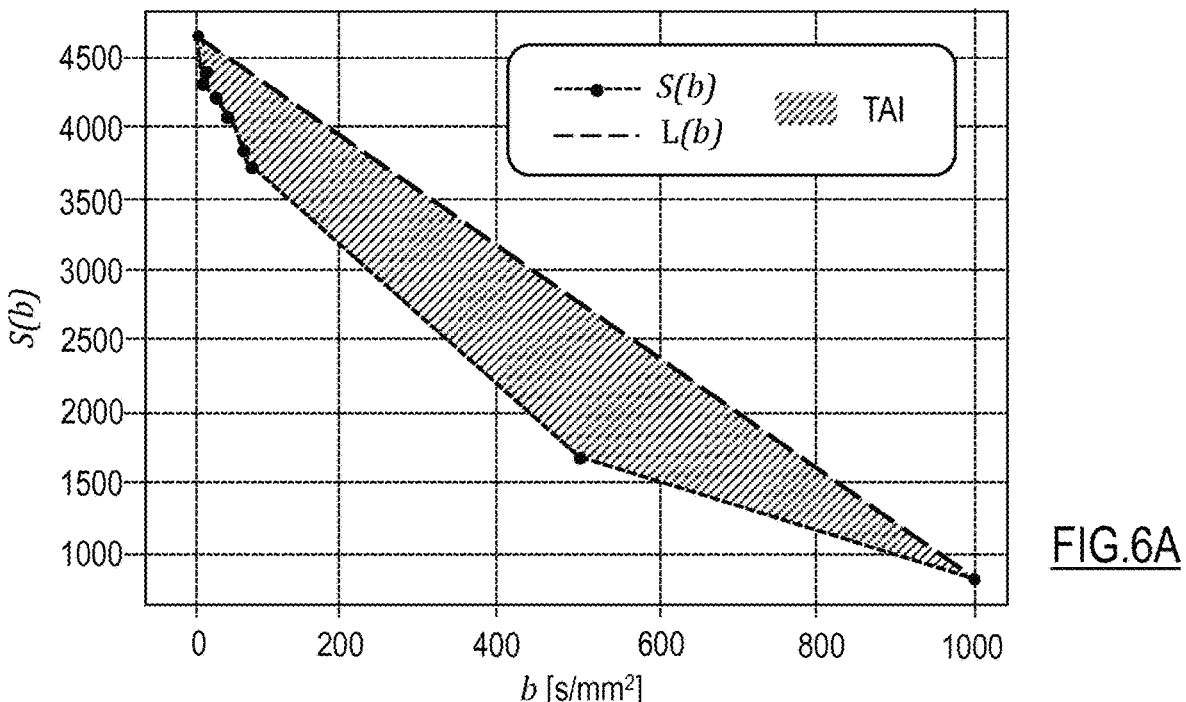
FIGS. 6A, 6B and 6C show variants of a quantification of a biomarker according to the invention on the basis of experimental data of a voxel of an organ.

A first embodiment of a quantification of the biomarker TAI, for a voxel of interest, is shown in FIG. 6A. The acquisition parameter, in this case the intensity of the diffusion gradient b, is comprised between the values $b_{min}$ and $b_{max}$, respectively equal to 0 and 1000 s/mm².

The experimental data S(b) are symbolized by points on a dotted line. The affine function L(b) describes a straight line marked on FIG. 6A in the form of an interrupted line. The quantification of the biomarker TAI corresponds to the subtraction, or the difference, between the area below the curve of the function L(b) and the area below the curve of the experimental data S(b). The area resulting from this subtraction is shown hatched in FIG. 6A and corresponds to the quantified value of the biomarker TAI in the form of a tissue activity indicator. It should be noted that advantageously the affine function L(b) was chosen such that $L(b_{min})=\Gamma_S[S(b_{min})]=S(b_{min})$ and $L(b_{max})=\Gamma_S[S(b_{max})]=S(b_{max})$.

Figure 6B:
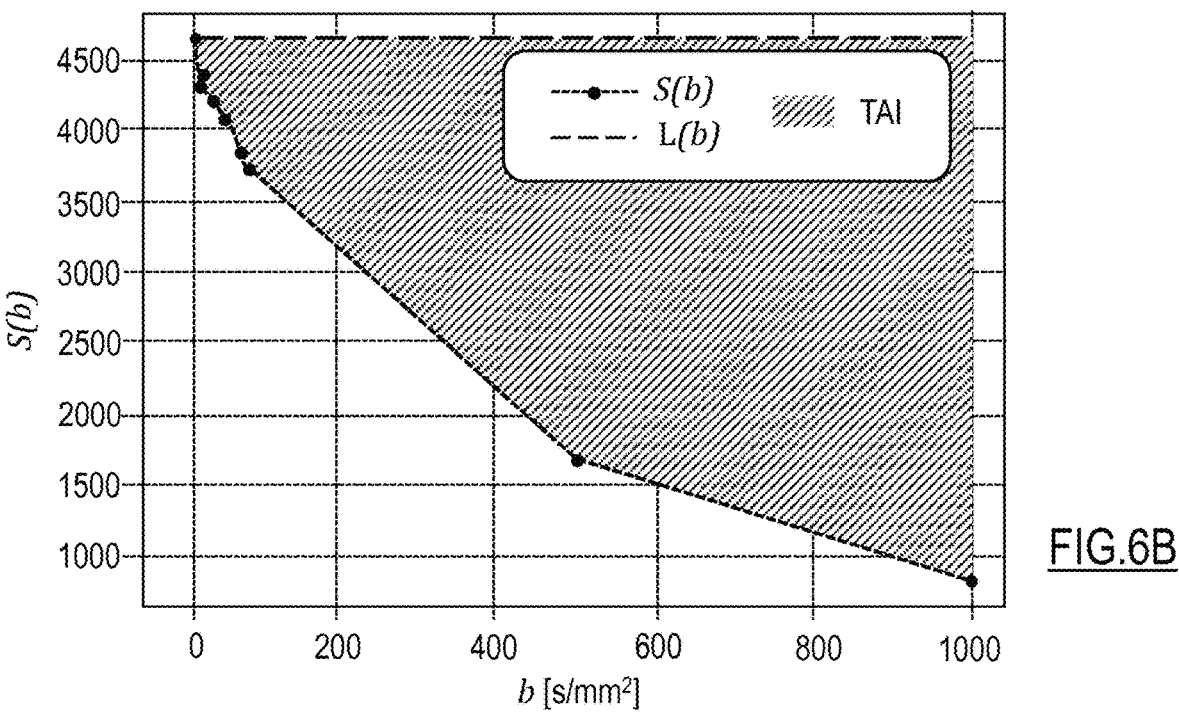
Figure 6C:
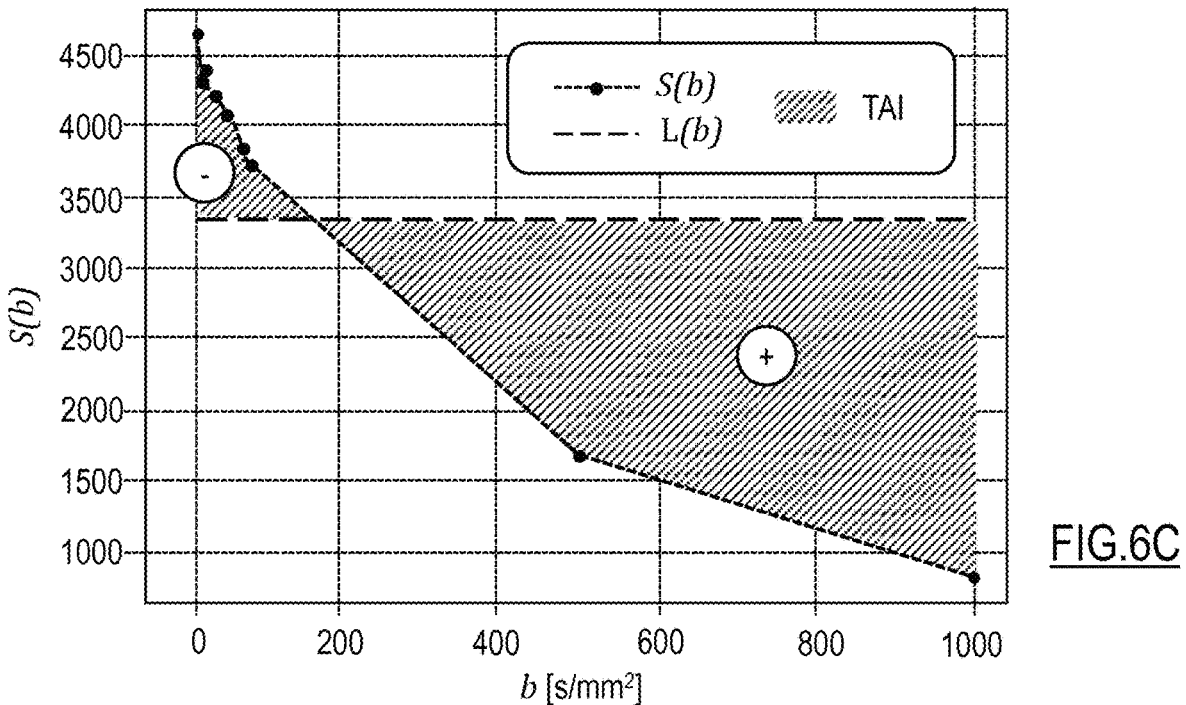

FIGS. 6B and 6C show two variants of a quantification of the biomarker TAI. According to these latter, the experimental data S(b) are identical to those utilized within the framework of the quantification according to FIG. 6A. On the other hand, the function L(b) is chosen, i.e. pre-established, calculated or parameterized, such that the latter describes a constant over the value interval $b_{min}$ to $b_{max}$. Thus, said function L(b) according to FIG. 6B is such that L(b) is constant and is equal to a value that is predetermined or deduced from the experimental data S(b). In this case, according to FIG. 6B, $$L(b) = \max_b S(b)$$

over the value interval $b_{min}$ to $b_{max}$, i.e. L(b) adopts the maximum value of the experimental data S(b) over said b-value interval. Like in FIG. 6A, the quantification of the biomarker TAI corresponds to the subtraction, or the difference, between the area below the curve of the function L(b) and the area below the curve of the experimental data S(b). The area resulting from this subtraction is shown hatched in FIG. 6B and corresponds to the quantified value of the biomarker TAI in the form of a tissue activity indicator. Such a constant can be determined or predetermined separately. Thus, as shown in FIG. 6C, the function L(b) can be chosen such that $$L(b) = \frac{1}{N_b} \cdot \sum_b S(b)$$

over the value interval from values $b_{min}$ to $b_{max}$, where $N_b$ describes the number of samples or experimental data in question. According to this example shown in FIG. 6C, the quantification of the biomarker TAI can be done in a signed manner, in fact, the curves determined by the function L(b) and the experimental data S(b) are secant about a value of b close to 200 s/mm². The difference between the areas below each curve L(b) and S(b) can be sometimes negative, sometimes positive, as shown in FIG. 6C for which the symbols "+" and "−" show these situations.

According to another technique, such a quantification of the biomarker TAI can be implemented by choosing a polynomial function L(b) of a higher order than or equal to two such that L(b)=$\alpha b^2$+$\beta b$+$\gamma$ for which:

$$\alpha = -\frac{S(b_{max}) - S(b_{min})}{(b_{max} - b_{min})^2}$$

$$\beta = \frac{S(b_{max}) - S(b_{min})}{b_{max} - b_{min}} - \alpha(b_{max} + b_{min})$$

$$\gamma = S(b_{min}) - \alpha b_{min}^2 - \beta b_{min}$$

In a variant, the bijective transformation $\Gamma_s[S(b)]$ can be logarithmic in nature. The step 130 of the method 100 can generate the value of the biomarker TAI on the basis of the transformation $\Gamma_s[S(b)]$ such that $$\Gamma_s[S(b)] = \ln\left[\frac{S(b)}{S(b_{min})}\right].$$

According to this variant, the function L(b) can be defined as a decreasing straight line passing through the two points $\Gamma_s[S(b_{min})]$ and $\Gamma_s[S(b_{max})]$. The invention is not to be considered limited by such choices or parameterizations of the function and bijective transformation. In a variant, any other combination suitable for the nature of the experimental data S(b) could be utilized, provided that L(b) remains a function of an acquisition parameter b and $\Gamma_s[S(b)]$ a bijective transformation of said experimental data S(b).

In order to parameterize the implementation of the step 130, the invention provides that a method 100 can comprise a step 110 for determining jointly the function L(b) and the bijective transformation $\Gamma_s[S(b)]$. When the imaging analysis system comprises an input human-machine interface, such as the interface 8 described with reference to FIG. 1 or FIG. 2, said input human-machine interface cooperating with the processing unit implementing said method 100, an operator 6 can express a gesture command or more generally an instruction, via said input human-machine interface 8, in order to choose, for example, from a predetermined database, input and/or adapt said function L(b) and bijective transformation $\Gamma_s[S(b)]$ according to their customary usage, their hardware, the organ examined, etc. The joint determination of the function L(b) of said acquisition parameter b and of the bijective transformation $\Gamma_s[S(b)]$ of said experimental data S(b) is thus done on the basis of input data of said user 6 of said input human-machine interface 8. The operator 6 can thus easily optimize the implementation of the method 100, and, consequently, the quantification and/or the output of the biomarker TAI indicating the tissue activity of the organ examined.

FIGS. 7A to 7D make it possible to highlight the benefit conferred by the invention with respect to the known methods, through a preferred application example. FIG. 7A shows a high-resolution anatomic image AI, obtained by a T2 sequence, and comprising a region of interest ROI, in this case a prostate. Said region of interest ROI is represented by a circle in an interrupted white line.

FIG. 7B shows, in the form of a parametric map PCb, the graphical rendering resulting from a quantification of a biomarker TAI, according to the invention, associated with a plurality of voxels of interest. For each voxel of interest, said biomarker TAI has been quantified by the implementation of a method, such as the method 100 described above, on the basis of experimental diffusion data S(b) resulting from an acquisition of a diffusion imaging signal. The PCb image obtained expresses said biomarker TAI in a colour gradient ranging from dark blue to yellow, according to whether the biomarker comprises a low or high value. It can be noted that the region of interest ROI, the prostate— represented by an interrupted white circle in FIG. 7B—is clearly distinguished with respect to the rest of the body of the patient. The biomarker TAI expresses pixels mainly describing a high tissue activity.

FIG. 7C shows, in the form of a parametric map PCc, an estimated biomarker, in this case an apparent diffusion coefficient ADC, for each of the same voxels of interest as for FIG. 7B, on the basis of similar experimental diffusion data S(b) but from a mono-exponential model following a method according to the prior art. One and the same colour gradient (from blue to yellow) applied to the values of the biomarker ADC makes it possible to distinguish with greater difficulty the region of interest ROI, in this case the prostate, from the rest of the body. Within said region of interest ROI, the graphical information associated with the biomarker ADC is also more diffuse than in the case of the biomarker TAI.

FIG. 7D shows, in the form of a parametric map PCd, an estimated biomarker, in this case a pseudodiffusion coefficient D IVIM, for each of the same voxels of interest as for FIG. 7B, on the basis of similar experimental diffusion data S(b) but from a bi-exponential model of the IVIM (intravoxel incoherent motion) type following a method according to the prior art. Like in FIG. 7C, one and the same colour gradient (from blue to yellow) applied to the values of the biomarker D IVIM makes it possible to distinguish with greater difficulty the region of interest ROI, in the case the prostate, from the rest of the body. Within said region of interest ROI, the graphical information associated with the D IVIM biomarker is also more diffuse than in the case of the biomarker TAI and very sensitive to noise, as is demonstrated by the presence of numerous high-value artefacts.

FIGS. 8A and 8B make it possible to measure even better the benefit conferred by the invention with respect to the known methods. In fact, said FIGS. 8A and 8B show a comparison of the performance on the basis of a contrast-to-noise criterion (also known by the abbreviation CNR). In fact, as shown in FIGS. 7B, 7C and 7D, the TAI (tissue activity indicator) biomarkers according to the invention, ADC (apparent diffusion coefficient) biomarkers of the mono-exponential model or D IVIM (pseudodiffusion coefficient) biomarkers of the bi-exponential model were estimated on the basis of experimental data S(b) taken from the multi-b diffusion imaging sequence without noise reduction process, the acquisition parameter b being comprised between 0 and 1000 s/mm². It is usual to compare performance on the basis of the CNR criteria, criteria prevalent in clinical imaging, making it possible to evaluate the detectability of a region of interest with respect to regions adjacent thereto. Such a CNR criterion is thus evaluated according to the following relationship:

$$CNR = \frac{|\mu_{ROI} - \mu_{BKG}|}{\sigma_{BKG}}$$

where $\mu_{ROI}$ and $\mu_{BKG}$ respectively describe average values of the region of interest ROI and of a region BKG adjacent to the aforementioned, $\sigma_{BKG}$ being the value of the standard deviation in said adjacent region BKG.

FIG. 8A is a partial view of a parametric map PCb describing the biomarker TAI and previously mentioned with reference to FIG. 7B making it possible to distinguish a prostate from the rest of the body of a patient. In FIG. 8A, a region of interest ROI is encircled artificially, to ensure understanding of the subject, by a white line. It is focused on the prostate more precisely than the region of interest ROI previously delimited by a circle in an interrupted line in FIGS. 7A to 7D. Three other adjacent regions, referenced respectively BKG1, BKG2 and BKG3, of said region of interest ROI have also been encircled by a white line in said FIG. 8A.

In order to compare the respective performance of the biomarkers TAI, ADC and D IVIM, a contrast-to-noise ratio CNR was calculated, for each biomarker, between one and the same region of interest ROI and different adjacent regions BKG1, BKG2 and BKG3, that are identical for the three biomarkers. In order to perform this comparison of performance, such a CNR was calculated on the basis of parametric maps PCb, as shown in FIG. 8A, but also of parametric maps PCc and PCd already described with reference to FIGS. 7B and 7D. Thus, for each biomarker, three CNRs were calculated: ROI vs BKG1, ROI vs BKG2 and ROI vs BKG3.

FIG. 8B shows the CNRs calculated for the three biomarkers TAI, ADC and D IVIM. It is clear that the quantification of the biomarker TAI according to the invention allows a better detectability of the prostate, as evidenced in FIG. 8B. The CNRs calculated on the basis of a parametric map PCb associated with the biomarker TAI are more than twice as high as those obtained on the basis of parametric maps PCc and PCd associated with the known ADC and D IVIM biomarkers, in particular as a result of the level of noise sensitivity that is greater for these two latter biomarkers.

This comparison makes it possible to emphasize that the invention achieves a method for the rapid quantification of a novel biomarker of tissue activity that is particularly resistant and stable with respect to the noises present in the medical imaging signals with respect to the other biomarkers that are applicable in this context. The invention thus provides a novel biomarker that can be utilized and is pertinent to a large number of applications among which there may be mentioned, non-limitatively, the analysis and/or monitoring of cancers, the evaluation of cerebral vascular accidents.

The invention claimed is:

1. A method for quantifying a biomarker of an elementary volume, called "voxel", of an organ of a human or animal patient, said method being implemented by a processing unit of a diffusion MRI imaging analysis system, and comprising steps for:

generating the value of said biomarker, hereinafter denoted "tissue activity indicator" or TAI, on the basis of experimental data S(b) corresponding to the voxel, wherein said step for generating the value of said biomarker TAI comprises, over a delimited interval $b_{min}$ to $b_{max}$ of values of an acquisition parameter b corresponding to the intensity of the diffusion gradient, the calculation $TAI=\int_{b_{min}}^{b_{max}}L(b)-\Gamma_S[S(b)]$ db, L(b) being a function of said acquisition parameter b and $\Gamma_S$ [S(b)] a bijective transformation of said experimental data S(b), wherein said experimental data S(b) is acquired from a plurality of digital image sequences obtained using an imaging device using nuclear magnetic resonance imaging;

generating an output image including a parametric map of pixels on an output human-machine interface of the diffusion MRI imaging analysis system, the output image encoding the value of said biomarker TAI for the voxel on the basis of a color gradient to express high tissue activity; and establishing a diagnosis of a pathology among a set of pathologies including ischemic vascular accident or cancerous lesions for the human or animal patient based on the output image including the parametric map of pixels displaying the high tissue activity.

2. The method according to claim 1, wherein said function and bijective transformation are mutually determined, so that L(b) is greater than or equal to $\Gamma_S[S(b)]$ over all the values of the acquisition parameter b between $b_{min}$ and $b_{max}$.

3. The method according to claim 1, wherein said function and bijective transformation are mutually determined, such that $L(b_{min})=\Gamma_S[S(b_{min})]$ and/or $L(b_{max})=\Gamma_S[S(b_{max})]$.

4. The method according to claim 1, the diffusion MRI imaging analysis system comprising an input human-machine interface, cooperating with the processing unit, said method comprising a step of determining the function L(b) of said acquisition parameter b and the bijective transformation $\Gamma_S[S(b)]$ of said experimental data S(b) on the basis of input data of a user of said input human-machine interface.

5. The method according to claim 1, wherein the step for generating the value of said biomarker is implemented by successive iterations for a plurality of voxels in question, said biomarker (TAI) being quantified per voxel.

6. The method according to claim 1, wherein the step for generating the value of said biomarker is implemented by successive iterations for a plurality of voxels in question, said biomarker (TAI) being quantified per voxel, and the step for triggering an output of said quantified biomarker (TAI) comprises generating an image in the form of a parametric map the pixels of which respectively encode the values of said quantified biomarker for the voxels in question.

7. A non-transitory computer-readable medium storing a program comprising one or more instructions that can be interpreted or executed by a processing unit of an imaging analysis system, wherein the interpretation or execution of said instructions by said processing unit causes the implementation of a method for quantifying a biomarker (TAI) of an elementary volume according to claim 1.

8. An imaging analysis system comprising a processing unit, an output human-machine interface, an imaging device using nuclear magnetic resonance imaging, and an interface for communicating with the imaging device and storage media, wherein:

the imaging device arranged to emit high-frequency electromagnetic waves on a part of the body of the patient including an organ and measure a signal re-emitted by atoms of the organ to acquire a plurality of digital image sequences of the organ;

the communication interface is arranged to receive from the imaging device experimental data S(b) of an elementary volume of an organ, said experimental data S(b) acquired from the plurality of digital image sequences of the organ; and the storage media contains instructions, the interpretation or execution of which by said processing unit causes the processing unit to:

generate a quantified biomarker of an elementary volume, called "voxel", of an organ of a human or animal patient, hereinafter denoted "tissue activity indicator" or TAI, over a delimited interval $b_{min}$ to $b_{max}$ of values of an acquisition parameter b corresponding to the intensity of the diffusion gradient, the calculation $TAI=\int_{b_{min}}^{b_{max}}L(b)-\Gamma_S[S(b)]\ db$, L(b) being a function of said acquisition parameter b and $\Gamma_S[S(b)]$ a bijective transformation of said experimental data S(b);

generate an output image including a parametric map of pixels, the output image encoding the value of said biomarker TAI for the voxel on the basis of a color gradient to express high tissue activity; and triggering an output of said biomarker TAI to the output human-machine interface, wherein the output of said biomarker TAI confirms a diagnosis.

9. An imaging analysis system according to claim 8, wherein:

the experimental data S(b) of an elementary volume of an organ are data resulting from an acquisition of a signal by diffusion MRI imaging; and the quantified biomarker is an indicator of the diffusion of water molecules (TAI) in an elementary volume of said organ.

10. The imaging analysis system according to claim 8, wherein the communication interface is arranged to transmit a graphical content, associated with said quantified biomarker by the implementation of a step of for triggering an output of said quantified biomarker (TAI) in a suitable format, to an output human-machine interface.

11. The imaging analysis system according to claim 8, wherein the communication interface is arranged to collect input data transmitted by an input human-machine interface of said system, said input data making it possible to determine a function L(b) of the acquisition parameter b and a bijective transformation $\Gamma_S[S(b)]$ of said experimental data S(b).

12. A method for quantifying a biomarker of an organ of a human or animal patient, the method comprising:

receiving, by a processing unit of a diffusion MRI imaging analysis system, experimental data as a plurality of digital image sequences obtained by an imaging device of the diffusion MRI imaging analysis system using nuclear magnetic resonance imaging;

iteratively, for each voxel of a plurality of voxels within the plurality of digital image sequences:

determining a measure of diffusion of water molecules for each voxel of a digital image sequence based on determining a difference between areas under two different curves in a an image, a first curve representing an arbitrary function of a diffusion gradient based on experimental data, and a second curve representing a bijective function, applied to a diffusion signal measured at different values of an acquisition parameter b in each of the digital images of the digital image sequence without noise reduction, wherein the diffusion signal is defined over a delimited interval;

generating a tissue activity indicator based on the measure of diffusion of water molecules for the voxel of the digital image sequence by combining the measure of diffusion of water molecules corresponding in each of the digital images; and generating an output image of the MRI imaging analysis system, the output image including a parametric map of pixels encoding the tissue activity indicator for each of the plurality of voxels, wherein the tissue activity indicator expresses the pixels describing a high tissue activity of the organ of a human or animal patient.

* * * * *